United States Patent [19]

Chiba et al.

[11] Patent Number: 5,097,343
[45] Date of Patent: Mar. 17, 1992

[54] APPARATUS FOR DRIVING THERMAL PRINTER HEAD IMAGE PRINTER

[75] Inventors: Kazuhiro Chiba; Noriko Bamba, both of Kyoto, Japan

[73] Assignee: Mitsubishi Denki K.K., Tokyo, Japan

[21] Appl. No.: 414,623

[22] Filed: Sep. 29, 1989

Related U.S. Application Data

[63] Continuation-in-part of Ser. No. 63,939, Jun. 19, 1987, abandoned.

[30] Foreign Application Priority Data

Jun. 20, 1986 [JP] Japan ................. 61-145484
Oct. 24, 1986 [JP] Japan ................. 61-254203

[51] Int. Cl.$^5$ .................................. H04L 1/21
[52] U.S. Cl. .................. 358/296; 346/76 PH
[58] Field of Search ........... 346/76 PH, 153.1, 134; 219/216 PH; 400/120; 358/296, 298, 300

[56] References Cited

U.S. PATENT DOCUMENTS 4,574,293 3/1986 Invi et al. ............... 346/76 PH
4,623,901 11/1986 Nagashima ............... 346/76 PH

FOREIGN PATENT DOCUMENTS 60192458 6/1986 Japan .
60240276 12/1986 Japan .
6145672 1/1987 Japan .

Primary Examiner—Leo P. Picard
Assistant Examiner—Lincoln Donovan
Attorney, Agent, or Firm—Sughrue, Mion, Zinn, Macpeak & Seas

[57] ABSTRACT

An image printer for creating a hard copy of a television image or an image produced by computer graphic having a high image quality. The image printer is provided with an apparatus for driving a thermal printing head having a processor which does not permit heat to be produced continuously across the boundaries between adjacent picture elements and for controlling the blocks of the thermal printing head to print a subline divided from one scanning line and to repeat the subline printing to complete the printing of the one scanning line.

25 Claims, 13 Drawing Sheets

FIG. 5A
DATA BEFORE CONVERSION

| 0 | 1 | 2 | 3 | 4 | 5 | 6 | 7 | 8 | 9 | 10 | 11 | 12 | 13 | 14 | 15 |

FIG. 5B
DATA AFTER CONVERSION

| 14 | 12 | 10 | 8 | 6 | 4 | 2 | 0 | 1 | 3 | 5 | 7 | 9 | 11 | 13 | 15 |

FIG. 5C
DATA AFTER CONVERSION

| 14 | 10 | 6 | 2 | 0 | 4 | 8 | 12 | 13 | 9 | 5 | 1 | 3 | 7 | 11 | 15 |

FIG. 8A DATA BEFORE CONVERSION

| 0 | 1 | 2 | 3 | 4 | 5 | 6 | 7 | 8 | 9 | 10 | 11 | 12 | 13 | 14 | 15 |

FIG. 8B DATA AFTER CONVERSION

| 2 | 2 | 1 | 1 | 0 | 0 | 0 | 0 | 0 | 0 | 0 | 1 | 1 | 1 | 2 | 2 |

FIG. 8C DATA AFTER CONVERSION

| 2 | 1 | 0 | 0 | 0 | 1 | 2 | 2 | 1 | 0 | 0 | 0 | 0 | 1 | 1 | 2 | ns
APPARATUS FOR DRIVING THERMAL PRINTER HEAD IMAGE PRINTER

This is a Continuation-in-Part of application Ser. No. 07/063,939, filed 6/19/87 now abandoned.

BACKGROUND OF THE INVENTION

1. Field of the Invention

The present invention relates to an image printer for creating a hard copy of a television image or an image produced by computer graphics or the like. More particularly, the invention relates to an apparatus for driving a thermal printing head in the image printer.

2. Description of the Prior Art

FIG. 1 is a block diagram schematically showing a conventional image printer. In this figure, an image signal is applied to an input terminal 101. Vertical and horizontal synchronizing signals are applied to another input terminal 102. The image signal is digitized by an A/D converter 103. Indicated by reference numeral 104 is a digital image memory. A density conversion unit 105 is provided to obtain various gradations corresponding to variation from white to black from the image data. A system control unit 107 includes a counter and gate circuits, and produces clock pulses for attaining synchronized operations, as well as other signals necessary for various circuits. A comparator 106 compares data C5 delivered from the density conversion unit 105 with an output C4 from the counter incorporated in the system control unit 107. A printer 108 comprises a thermal printing head and a mechanism that mainly consists of a means for moving paper on which the head will part.

An operation of this apparatus will be described below.

The image signal applied to the input terminal 101 consists of a luminance signal in the form of the NTSC television signals. Signal ranging from a reference black level to a reference white level is quantized into six bit digits, for example, by the A/D converter 103. Then, the quantized image data is successively written to the image memory 104 from an address previously specified. It is assumed that the number of the sampled data items of one horizontal scanning line is 640 and that one frame consists of 480 horizontal scanning lines. The capacity of the memory is 640(H)×480(V)×6 bits=1.8 Mbits. The image data for one frame stored in the memory 104 is read out in a given sequence and converted into 8-bit time axis data by the density conversion unit 105 so that printing may be performed on the paper with 6 bits in 64 gradations. The system control unit 107 includes a counter which counts the number 256 in the print time for one scanning line and expresses time in 8 bits. The output C4 from the counter is compared with the data C5 delivered from the density conversion unit 105 by the comparator 106. The print head of the printer 108 is activated or deactivated according to the output C6 from the comparator 106 to selectively print.

FIG. 2 shows the structure of the thermal printing head and an example of driving the head. The head comprises 640 resistance members, for example. If the 640 resistance members are simultaneously energized or deenergized, this causes undesired excessive electric power consumption. Therefore, the head is divided into several blocks which are successively energized for a printing operation. In this example, the head is divided into five blocks B1–B5 as shown in FIG. 2. Each block includes 128 resistance members. Six hundred forty (640) data for one scanning line are read out from the memory 104 during one counting operation for count data C4 of an 8-bit counter. These data are converted by the density conversion means 105 into 8-bit, time axis data which are successively compared with the data C4 by the comparator 106. At this time, a signal of low level is produced to deactivate the head in case of the relation being C4≧C5. When C4<C5, a signal of high level is produced to activate the head. These operations are successively carried out for all the data items. The output signal C6 from the comparator is supplied to a register in the head of the printer 108 together with the transferred clocks contained in a signal C7. These signals are temporarily stored in the register. Then, those signals which are contained in the signal C7 to activate the blocks of the head are successively made to go high during the periods $T_1$, $T_2$, $T_3$, $T_4$, $T_5$, respectively, to print 1/256 of the N-th the scanning line. Thus, printing at count 0 specified by the count signal C4 is completed. Thereafter, image data items for the N-th scanning line are again read from the image memory 104 and successively converted into time axis data items C5 by the density conversion means 105. The output C5 from the conversion means 105 is compared with the updated count signal C4 that assumes value "1" to produce the signal C6 which successively activates or deactivates the resistance members. Then, the same operation is performed as in the case of count "0". As a result, printing at the count "1" specified by the signal C4 is completed. This process is repeated until count 255 is reached, in order to complete a printing operation for the N-th scanning line. The same process is carried out for the (N + 1)th scanning line as in the case of the N-th scanning line. These operations are repeated for 480 scanning lines to create a hard copy of an image.

At this time, the mechanism of the printer 108 intermittently or continuously feeds the paper. The movement of the paper is so controlled that the aspect ratio is 3:4 that meets the standard of the NTSC television. The system control means 107 produces various signals including C1, C2, C3, C4, C7, C8 in response to both the synchronizing signal applied to the input terminal 102 and the clocks generated inside the control means 107. The clocks C1 are applied to the A/D converter. The control signal C2 consists of a signal indicating addresses and a read/write signal, and is applied to the image memory 104. The clocks C3 are necessary for the density conversion unit 105. The count signal C4 is delivered from the counter and indicates the elapse of time with 8 bits. The clocks C7 are needed for the operation of the head. The signal C8 is required for sequentially controlling the printing mechanism. A desired black-and-white hard copy of an image is produced in 64 gradations by the structure and the operations described above.

The above described conventional apparatus is disadvantageous in that the densities at picture elements which neighbor in the direction of the movement of the paper are different because of thermal hysteresis. In the case where a print is made at low density, the activated portions of the head are concentrated in forward portions for the print of one picture element. Therefore, the printed image looks rough. In any case, the print quality is poor.

Another conventional apparatus will be described in more detail with reference to FIG. 3 which is a block diagram showing a conventional apparatus for driving a thermal printing head. In FIG. 3, data C11 regarding an image or another form of data converted from the image data is applied to an input terminal 201. A signal C12 for switching between read mode and write mode is applied to another input terminal 202. A line buffer 206 comprises a digital memory for storing data for one line of an image. A write control circuit 203 produces write addresses and other data for the line buffer 206. A read control circuit 204 comprises a block address counter 204a and an address counter 204b, and produces read addresses and other data for the line buffer 206. A selector 205 selects either a write control signal C13 or a read control signal C14 as a control signal C15 applied to the line buffer 206. A time axis counter 207 determines the time for which a print is made. A comparator 208 compares the image data or data converted therefrom C18 which is delivered from the line buffer 206 in a desired sequence with a time axis data C19 delivered from the time axis counter 207. An output terminal 209 supplies data C20 to the thermal printing head of the thermal printer.

An operation of the above will be described with reference to FIGS. 2 and 3. It is now assumed that the image data C11 for one line which is applied to the input terminal 201 is 8-bit data. A write signal at high level is applied to the input terminal 202 for switching between read mode and write mode, in order to put the line buffer 206 into write mode. At this time, the control signal C15 fed to the line buffer 206 is produced as a write control signal C13 from the write control circuit 203 through the selector 205. Input data C11 for one line is stored in the line buffer 206 at addresses specified by the write control circuit 203. The control signal C15 includes address signals, an output enable signal, and other signals.

Then a read signal that is at low level is applied to the input terminal 202 for switching between read and write modes, in order to bring the line buffer 206 into read mode. Under this condition, the control signal C15 is produced delivered from the read control circuit 204 as a read control signal C14 through the selector 205. Data is read from the line buffer 206 in a desired sequence.

The time axis counter 207 counts $2^8 = 256$. bits of data at given intervals. The comparator 208 compares the time axis data C19 delivered from the counter 207 with the output C18 from the line buffer 106. The output from the comparator 208 appears at the output terminal 209 as a data signal C20 that determines the time for which the head is activated.

Assuming that the block address counter 204a in the read control circuit 204 specifies the first block, the address counter 204b successively specifies addresses in the block. Thus, 128 bits of data concerning the first block are read out.

The data C18 read out is compared with "0" of the output data C19 from the time axis counter 207 by the comparator 208. When the value of the intensity data C18 is less than the amount of the count data C19, the head is deactivated. In this state, the data signal C20 is made to be low. When the value of the intensity data C18 is equal to or larger than the amount of the count data C19, the head is activated. In this state, the data signal C19 is caused to be high. The data signal C20 is delivered continuously from the output terminal 209 and transferred to a register that is provided within the head for the block B1. Then, the data is temporarily stored there.

These signals are used to activate and deactivate the first block B1 of the head of the thermal printer, in order to print, for 1/25 of printing time of one block. Subsequently, the time axis counter 207 counts input data forward until "1" is reached. In this state, a printing is performed using the first block B1 in the same manner as the foregoing.

Thus, the time axis counter 207 increments 256 times until the value the count output reaches "256", and 256 printing operations are made, thus completing the printing using the first block B1. Thereafter, the block address counter 204a specifies the second block B2. Prints are made with the second block B2 in the same manner as the aforementioned process. Similar prints are made with the third through fifth blocks B3-B5. As a result, one line of printing is completed. During this process, the first block B1, the second block B2, the third block B3, the fourth block B4, the fifth block B5 are activated for periods T1, T2, T3, T4, T5, respectively. Only one of the blocks B1-B5 is activated at a time.

It is assumed that it takes about 37.5 $\mu$s to print 1/256 of a total printing period one picture element. In order to completely print one block, a period 256 times as long as that interval, i.e., about 9.6 ms, is required. To print one line, a period five times as long as the period, i.e., about 48 ms, is needed. Where one image is formed by 480 lines, it takes about 23 seconds to make a print of one full image.

The above described conventional apparatus for driving the thermal printer head is disadvantageous in that the head is not activated at least for a period 4/5 times the period taken to print one line, and the head is thus deactivated continuously for about 38 ms out of about 48 ms taken to print one line resulting in the blocks adjacent to the block which is presently used for printing being cool and a large temperature difference therebetween. Accordingly, the temperature of both ends of the block that is now used for printing increases at a rate lower than that of the central portion and so the print density at both ends of the black is lower than the density at the central portion of the black. In this way, the density becomes nonuniform within one block. This creates white stripes at the boundaries between neighboring blocks.

SUMMARY OF THE INVENTION

In view of the above, an object of the present invention is to provide an apparatus for driving a thermal printing head for use in an image printer, which is capable of producing a hard copy of a television image or an image produced by computer graphic, having high image quality.

The above and other objects of the present invention are accomplished by the provision of an improved apparatus for driving a thermal printing head, provided with a processing means which does not permit heat to be produced continuously across the boundaries between adjacent picture elements. Especially, according to the present invention when a print is made at low density, one picture element is formed by dispersed plural color-developing dots.

The processing means controls the blocks of the thermal printing head to successively print for every subline and repeat the printing operation several times to complete the print for one line.

The above objects, advantages and features of the invention will be better understood from the following description of the invention which is provided in connection with the accompanying drawings.

BRIEF DESCRIPTION OF THE DRAWINGS

In the accompanying drawings:

FIG. 5 is a diagram showing an example of a signal C4 in FIG. 4 and FIGS. 5B and 5C are diagrams showing examples of a signal C10 in FIG. 4;

FIG. 8A is a diagram showing an example of a signal C4 in FIG. 7 and FIGS. 8B and 8C are diagrams showing examples of a signal C10 in FIG. 7;

DESCRIPTION OF THE PREFERRED EMBODIMENTS

Figure 4:
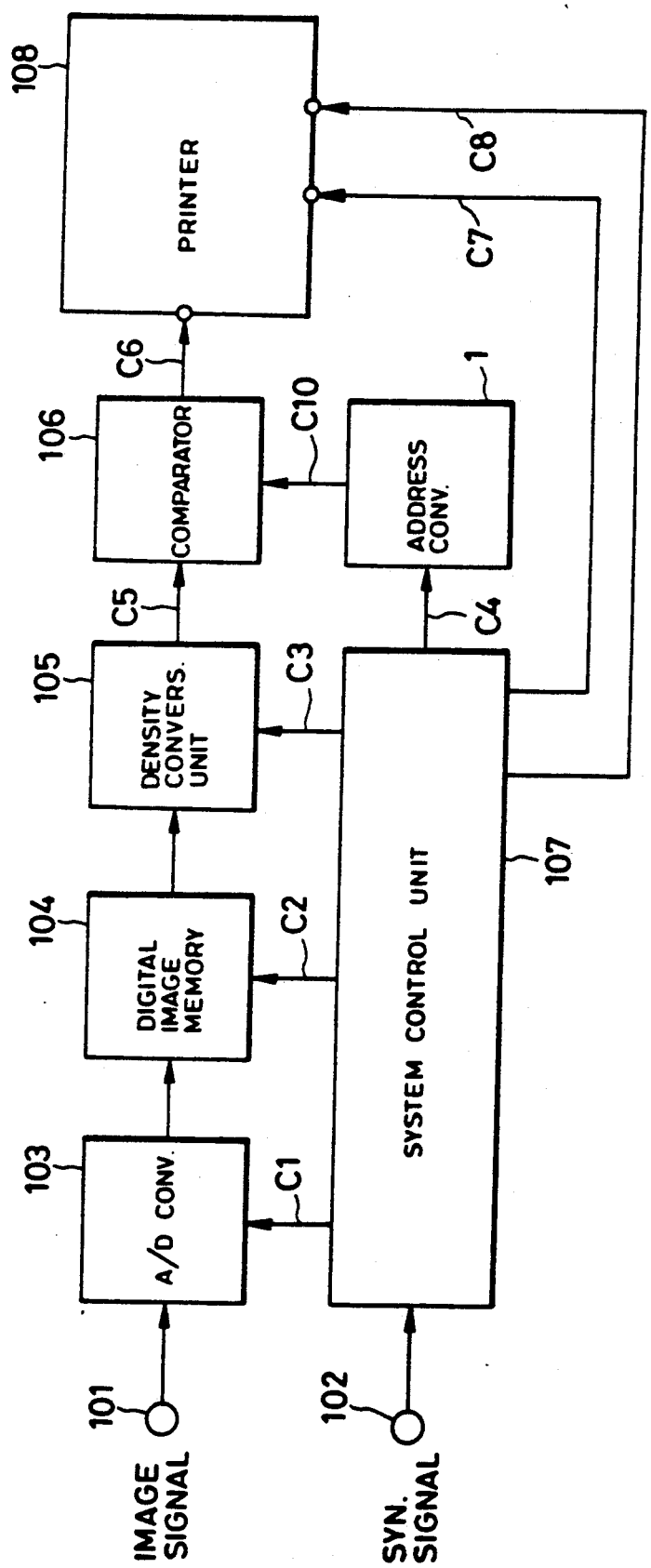
FIG. 4 is a block diagram showing an image printer according to the present invention.

Referring to FIG. 4, an address converter 1 converts the output signal C4 from the count counter in the system control unit 107 into other data C10, the count signal C4 indicating elapsed time. The comparator 106 compares the time data C10 from the address converter 1 with the data C5. The output signal from the comparator 106 activates or deactivates the thermal printing head. The other elements in the apparatus are same as those having corresponding reference numerals in the conventional apparatus already described in their construction and operation.

Figure 6:
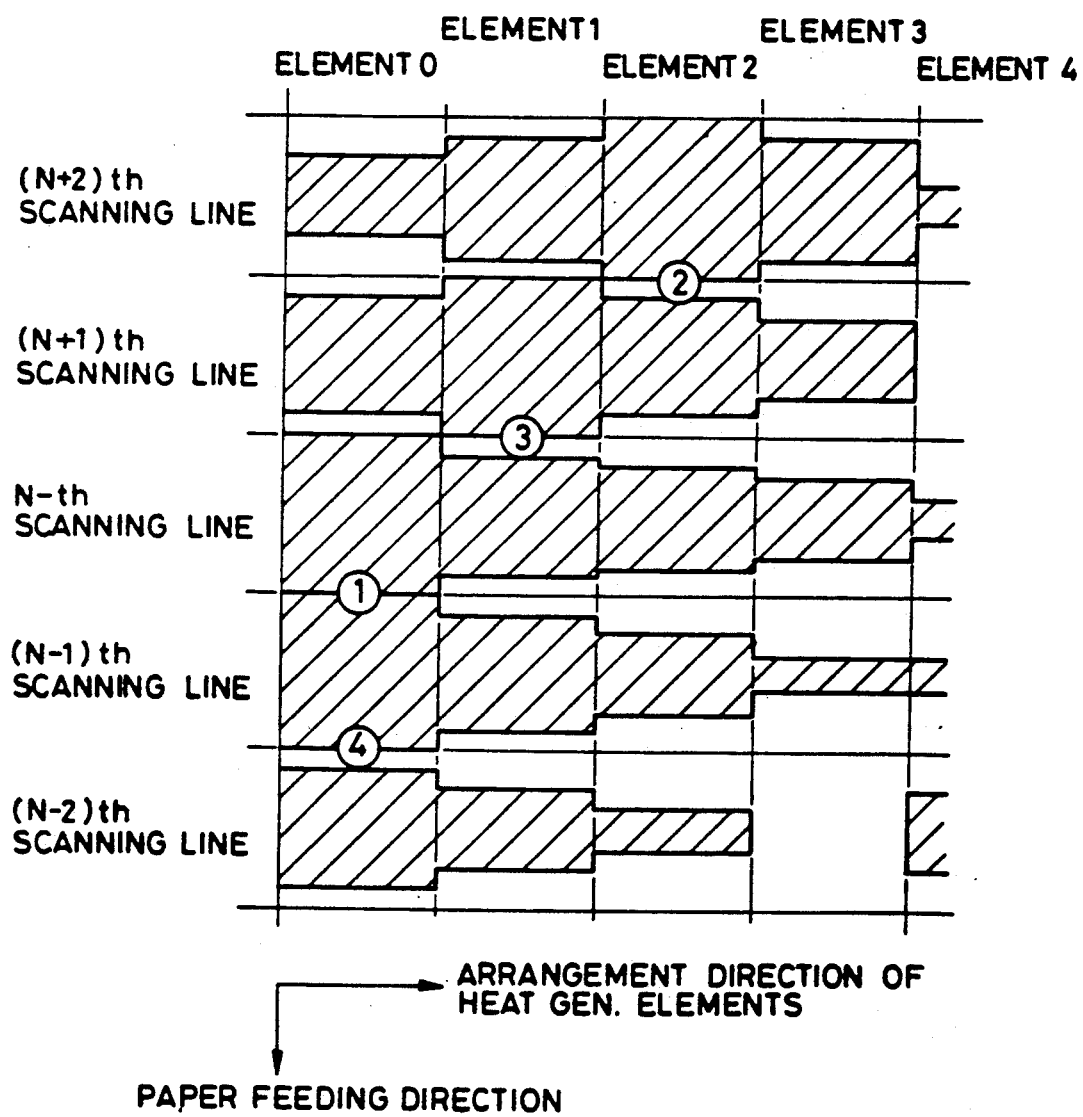
FIG. 6 is a diagram showing an example of printing condition.

In the same manner as the conventional printer already described, this printer quantitizes data into 6-bit digits, and the signal C4 and is an 8-bit counter output. For simplicity, it is assumed that data is quantized into binary digits and that C4 is the output from a 4-bit counter. The value of the signal C4 manotonically increases from 0 to 15 as printing for each scanning line is carried out, as shown in FIG. 5(A). The amount signal C4 is converted by the address converter 1 for the printing for every scanning line as shown in FIG. 5(B). Then, if the converted count data C10 is the less than or equal intensity data C5, the thermal printing head is activated. In this state, the printing is made as shown in FIG. 6. With a conventional apparatus the output as shown in FIG. 5(A) is subjected to comparison in the comparator 106 to produce an activating/deactivating signal for the thermal printing head. Therefore, printed dots are liable to be concentrated near the front end of one line. In comparison, according to the, present invention, however, as illustrated in FIG. 5(B) and FIG. 6, a deactivating signal is produced at the beginning and at the end of one line. Therefore, a cooling period of time can be provided between the dot printing operations. Consequently, it is possible to provide a cooling period of time after the printing of a dot having the maximum density as indicated in FIG. 6 at circled numbers 2, 3 and 4. Hence, it is unlikely that the density becomes nonuniform because of thermal hysteresis. In the case of continuous printing at the maximum density as shown in FIG. 6(1), the following dot is printed without cooling period, as a result of which the density becomes nonuniform because of thermal hysteresis. In this case, however, the printing quality is remarkably improved when compared with that of the conventional apparatus. Also, a conversion scheme as shown in FIG. 5(c) is possible. In this case, a deactivating signal is produced at two remote locations. The distance between one print position and the next print position is made equal to half of the width of each picture element. Consequently, the printed image looks less rough, especially at low density.

Figure 7:
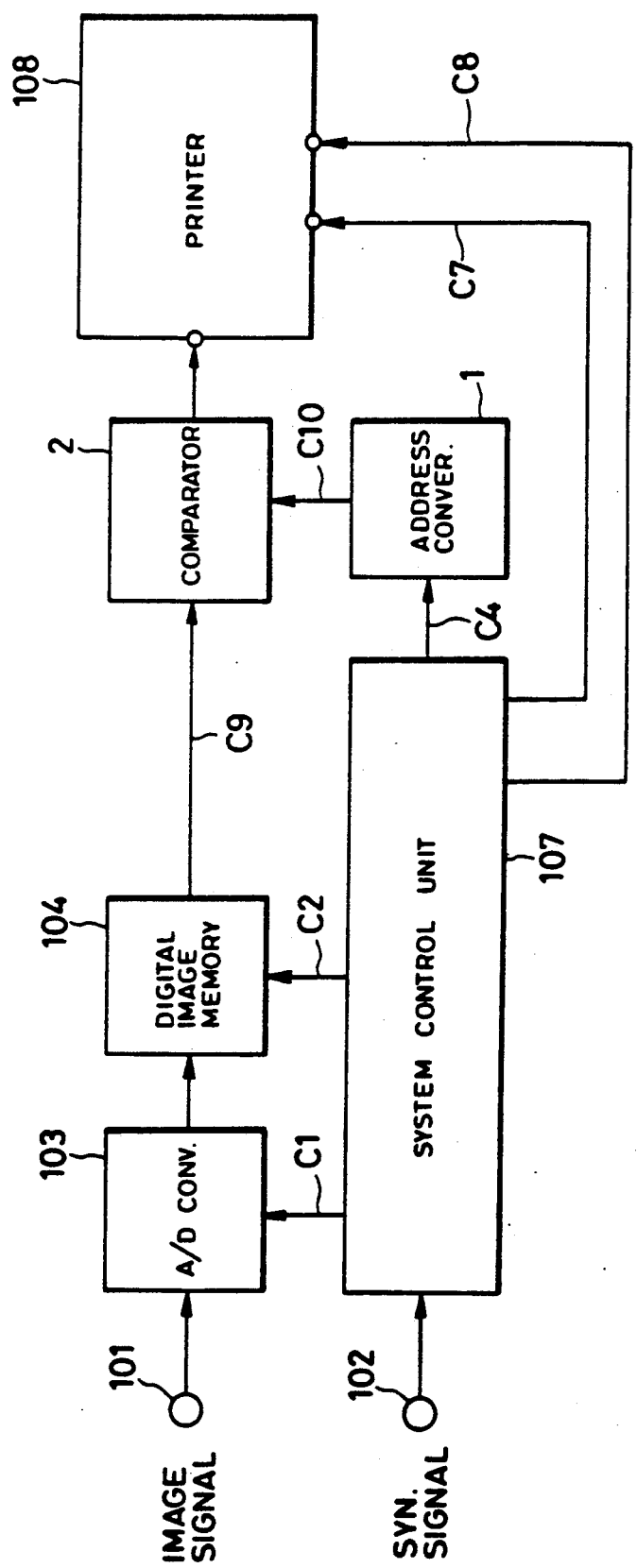
FIG. 7 is a block diagram showing another embodiment of an image printer according the present invention.

FIG. 7 shows another example of the invention. In the same way as in the above example data is quantized into binary digits, and the count signal C4 is the output from the 4-bit counter. While the image, signal which is subjected to binary quantization, is converted into 4-bit time axis data by the density conversion means 105 and applied to the comparator 106 in the above described example, no density conversion is performed in this example. The count signal C4 is converted into binary gradation data by the address conversion unit 1 to be compared with the image data in the comparator 2 so as to activate and deactivate the head.

FIG. 8(B) and FIG.8(C) show count conversion results which yield the same operational results as FIG. 5(B) and FIG. 5(C). In FIG. 8, gradation 0 shows the density when a print 10 made in response to no pulse counted. Gradation 1 shows the density when a print is made in response to the seventh pulse counted. Gradation 2 shows the density when a print is made in response to the twelfth pulse counted. Gradation 3 shows the density when a print is made in response to the sixteenth pulse counted.

When the converted count data C10 is equal to or greater than the image data C9 indicating gradations, the comparator 2 produces a low-level signal to the printer to deactivate the head. On the other hand, the converted count data, when C10 is less than intensity data C9, the comparator 2 produces a high-level signal to the printer to activate, the head. Accordingly, in this example, when the intensity data C9 is zero, the head is not activated. When C9 is 1, the head is activated in response to 7 successive bits of the converted data in FIG. 8(B) representing zero and hence less than 1. When the intensity data C9 is 2, the head is activated in response to 12 successive bits of the converted data representing 0 or 1 and hence less than 2. When C9 the intensity data is greater than 2, the head is activated in response to all 16 successive bits of the converted data representing 0, 1, or 2 and hence less than 3. In this way, the aforementioned gradation is realized.

In the above examples, for the sake of illustration, data is quantized into binary form, and the output from the time counter takes four-bit form. The present invention is not limited to this scheme. This concept can be applied to any case as long as the number of bits created by the quantization is less than the number of bits of the output from the time counter. For instance, data may be produced as eight-bit digits. Also, conversions are not restricted to those shown in FIGS.5(B), 5(C), 8(B) and 8(C) but rather any conversion may be employed as long as it is helpful at least either in preventing nonuniformity of density due to thermal hysteresis or improving the condition of printing at low density.

Further, the number of the blocks of the printing head is not limited to five. In addition, the printing is not restricted to the present system.

Furthermore, graphic diagrams other than pictorial pattern can be printed by replacing the A/D converter means 103 with a digital interface means.

Figure 1:
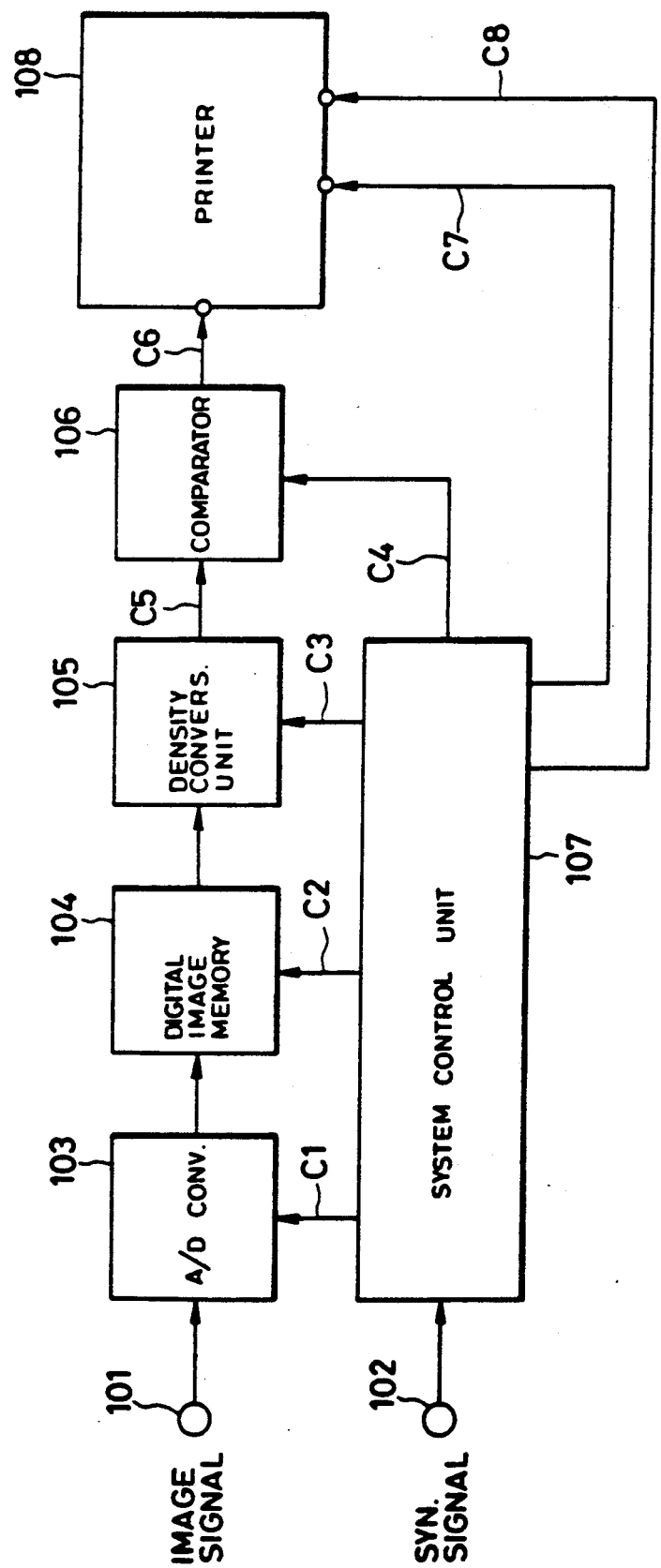
FIG. 1 is a block diagram schematically showing a conventional image printer.
Figure 2:
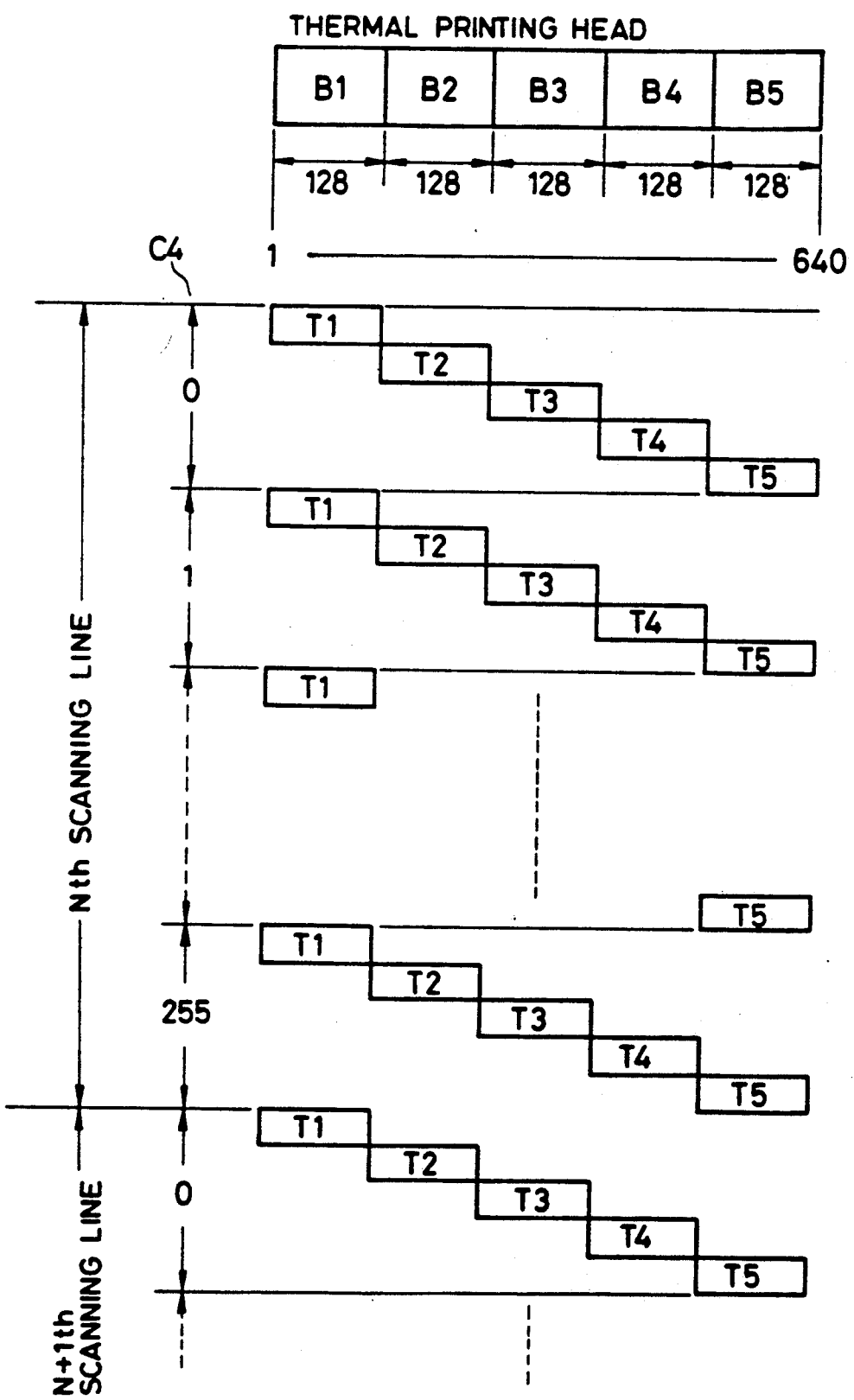
FIG. 2 shows the structure of a thermal printing head divided into five blocks and the operation thereof.
Figure 3:
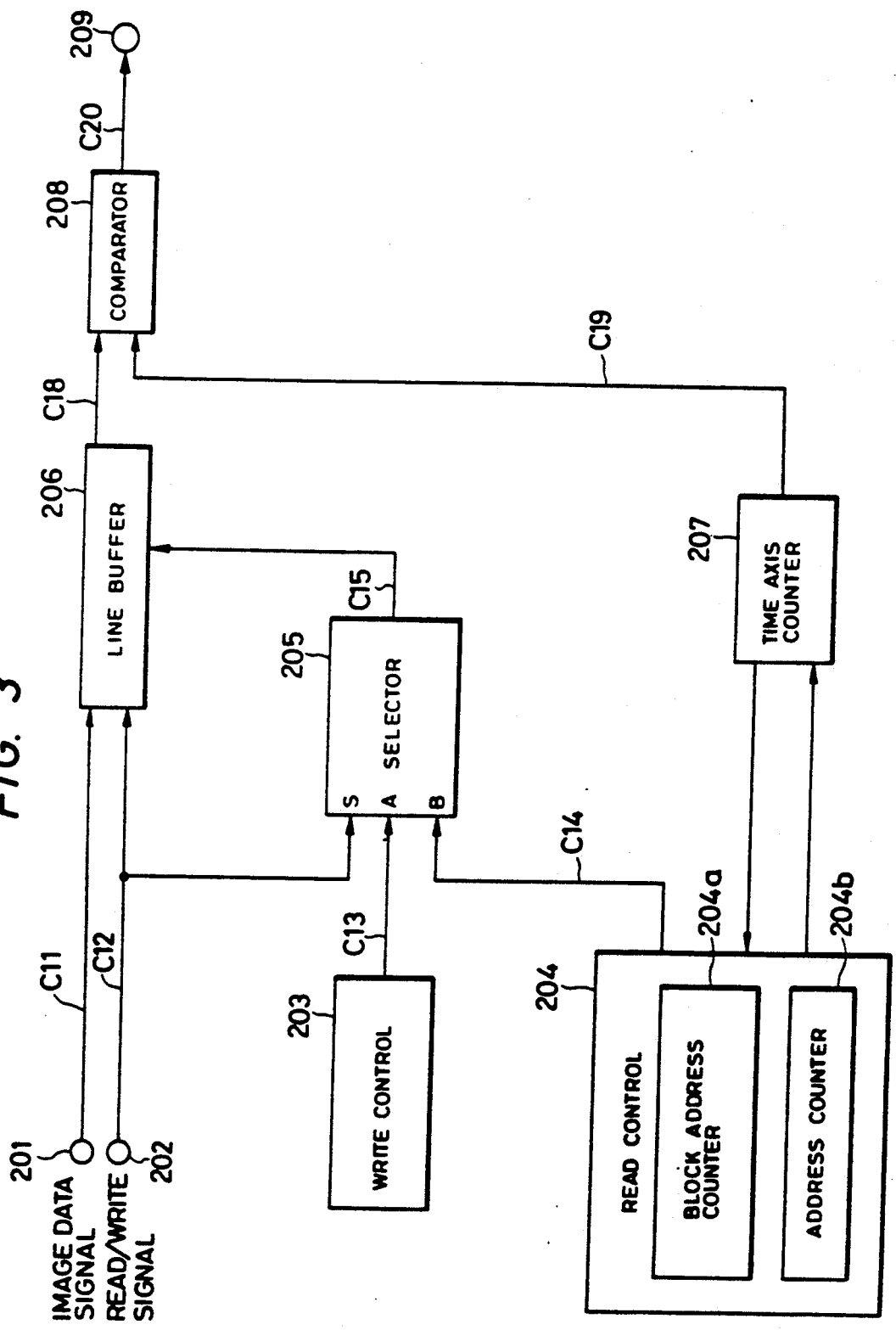
FIG. 3 is a block diagram showing a conventional apparatus for a thermal printing head in the image printer.
Figure 9:
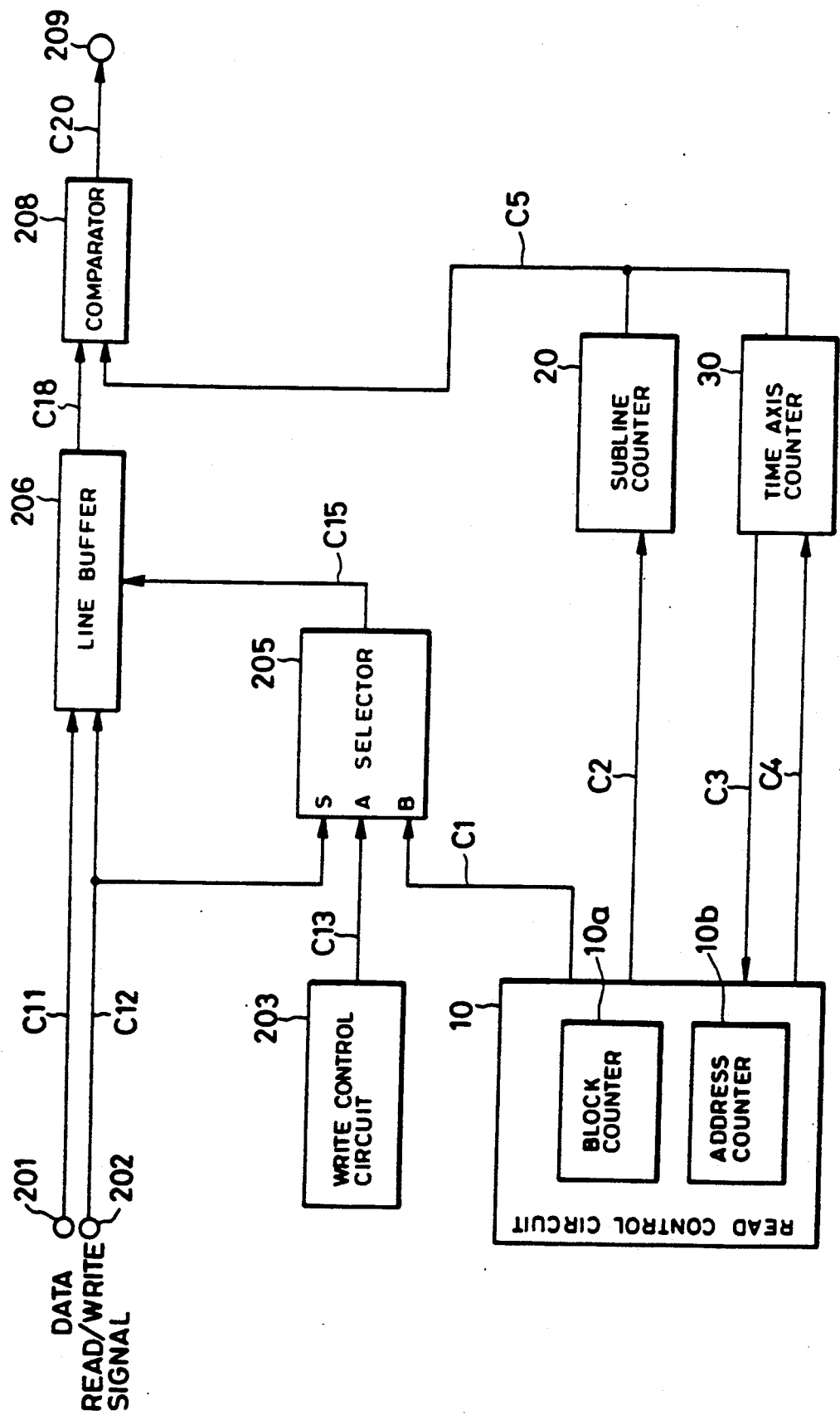
FIG. 9 is a block diagram showing a further embodiment of an image printer according to the present invention.

FIG. 9 is a block diagram showing another example of an apparatus for driving a thermal printing head according to the present invention. In FIG. 9, circuit elements that are the same as those in FIG. 3 bear the same reference numerals. A read control circuit 10 includes a block counter 10a and an address counter 106, and produces read addresses and other data for a line buffer 106. A two-bit subline counter 20 counts forwardly carry signals C2 delivered from the block counter 10a in the read control circuit 10. A six-bit, time axis counter 30 specifies the time for which printing is performed.

Figure 10:
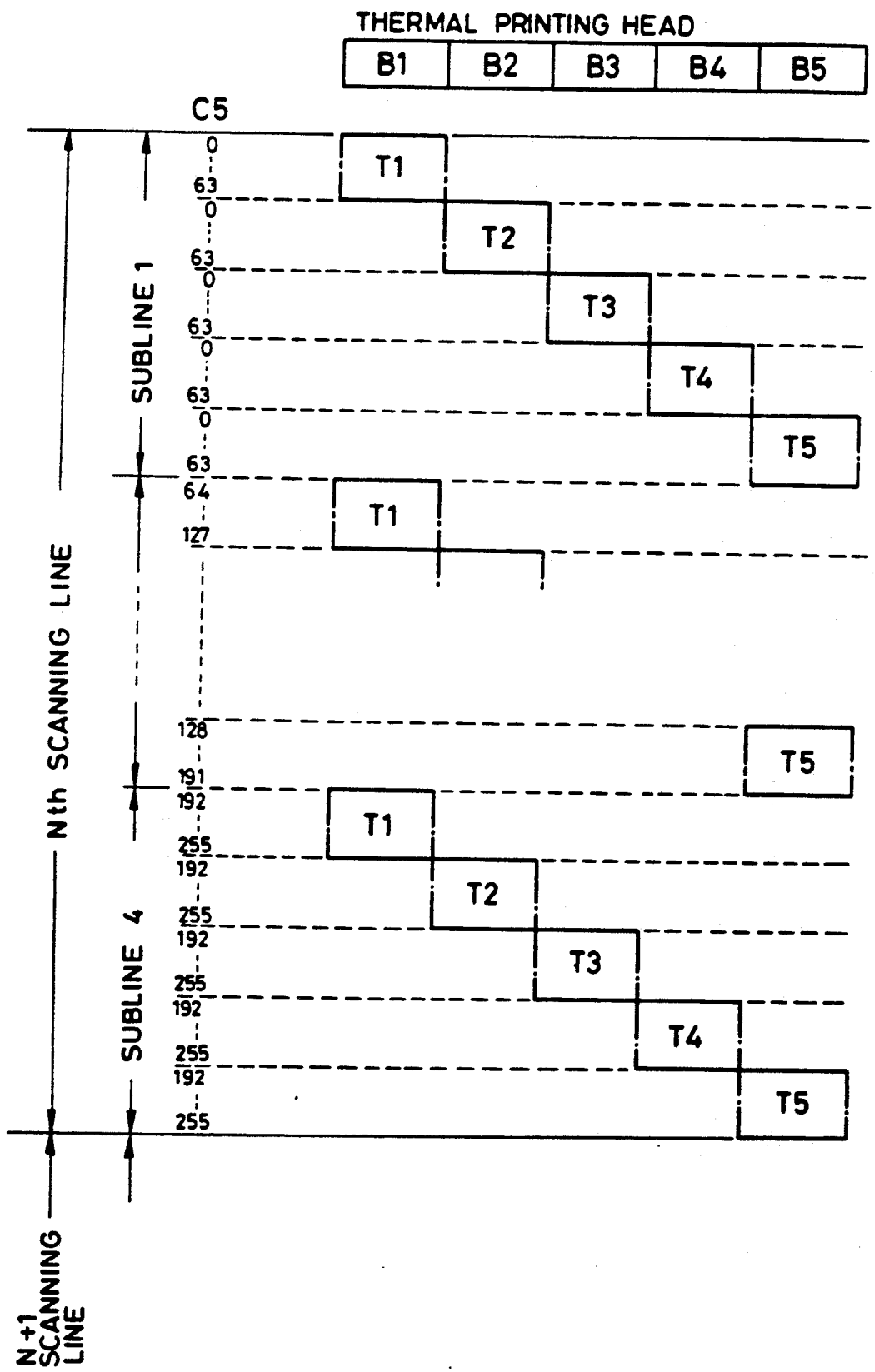
FIG. 10 shows the structure of thermal printing head divided into five blocks and the operation thereof.

The manner in which the apparatus constructed as described above drives the thermal printer head will be described with reference to FIG. 10.

Data for one line which is stored in the line buffer 206 is read out for each of blocks B1 to B5. The output data C18 from the buffer 206 is compared with the output data C5 from the time axis counter 30 and the subline counter 20 by the comparator 108. The output from the comparator 208 is delivered to the output terminal 209 as a signal for activating or deactivating the thermal printing head.

The operation of the head is now described in greater detail, using the aforementioned numerical values.

First, the contents of the time axis counter 30 and the subline counter 20 are set to "0". Data for the first block B1 is read from the line buffer 106, and a printing is performed over 1/256 of the time period for one block. The time period required for this printing operation is defined as a heating unit time period ts. Then, its time axis counter 30 is incremented until every bit of the contents reaches "1". Again, printing is performed for 1/256 of one block. Similarly, a print is made with the first block B1 until every bit of the 6-bit counter 30 reaches "1". i.e., the contents of the time axis counter 30 reach "63". A number of continuous times that the heating unit time period ts has elapsed is defined by C. Thereafter, the contents of the counter 30 are reset to "0". The contents of the block address counter 10a in the read control circuit 10 are made to indicate the second block B2. In the same way as in the case of the first block B1, a print is made with 64/256 (=1/4) the time period of the second block B2 while varying the value of the time axis data from 0 to 63.

Subsequently, the printing operation are carried out with the third through fifth blocks B3, B4, B5 in like manner. The total number of blocks is defined by B. In this way, a fourth of one line, which is herein referred to as "a subline" is printed.

Next, the subline counter 20 is incremented until every bit of the contents reaches "1". The contents of the time axis counter 30 are increased from 0 to 63 in the same way as in the case of the first subline. Thus, the two uppermost bits of the contents of the subline counter 20 become "01". The value of the output data C5 varies from 64 to 127. For the second subline, printing operations are carried out with the blocks B1-B5 while varying the value of data C5 from 64 to 127 in the same manner as in the case of the first subline. The contents of the subline counter 20 assume a value "10" for the third subline. The value of the data C5 changes from 128 to 191. For the fourth subline, the contents of the subline counter 20 take on a value "11". The value of the data C5 varies from 192 to 255. A full print of an image is made with the four sublines. The total number of sublines is defined by S.

Assuming that it takes about ts=37.5 Abs to print 1/256 of one picture element, in order to print one block in one subline, the time required to print with one block is 64 times as long as that period, i.e., 2.4 ms, which is the same as the time taken conventionally. Consequently, the present system does not prolong the time taken to carry out the printing operation.

The heating in order to print one line of the image is controlled in accordance with a line operating formula as follows. (heating unit time period ts) * (the number of continuous times of the heating unit time period C) * (the number of the blocks B) * (the number of sublines S)

The heating to print one pixel of the image is controlled in accordance with a pixel operating formula as follows. (heating unit time period ts) * (the number of continuous times of the heating unit time period C) * (the number of sublines S)

The heating element corresponding to the printing image are controlled so as to be turned on or off every heating unit time period ts in response to the image data or the density data. The above described parameters C, B and S are set to be a positive integer not smaller than 2.

In the above description, the number of the sublines is four. Generally, one line consists of sublines, and thus when the "a" is made equal to one, then the value of system is the same as the prior art system.

Also in the above example, one line is divided into equal sublines. However, it is not always necessary to divide one line into equal sublines. Especially, when the number of the sublines is a submultiple of the number of counts made by the time axis counter per block, each subline can be divided by the same time.

Figure 11A:
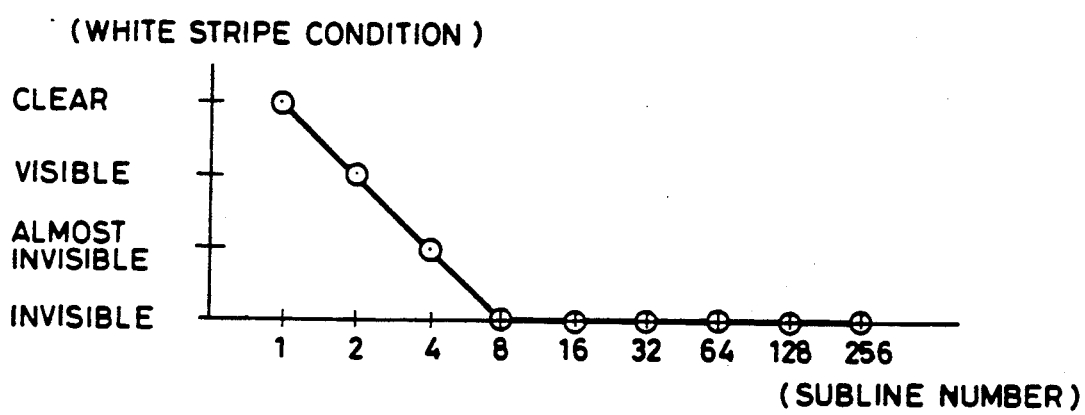
FIG. 11A is a diagram showing the condition of white stripes produced between neighboring blocks.
Figure 11B:
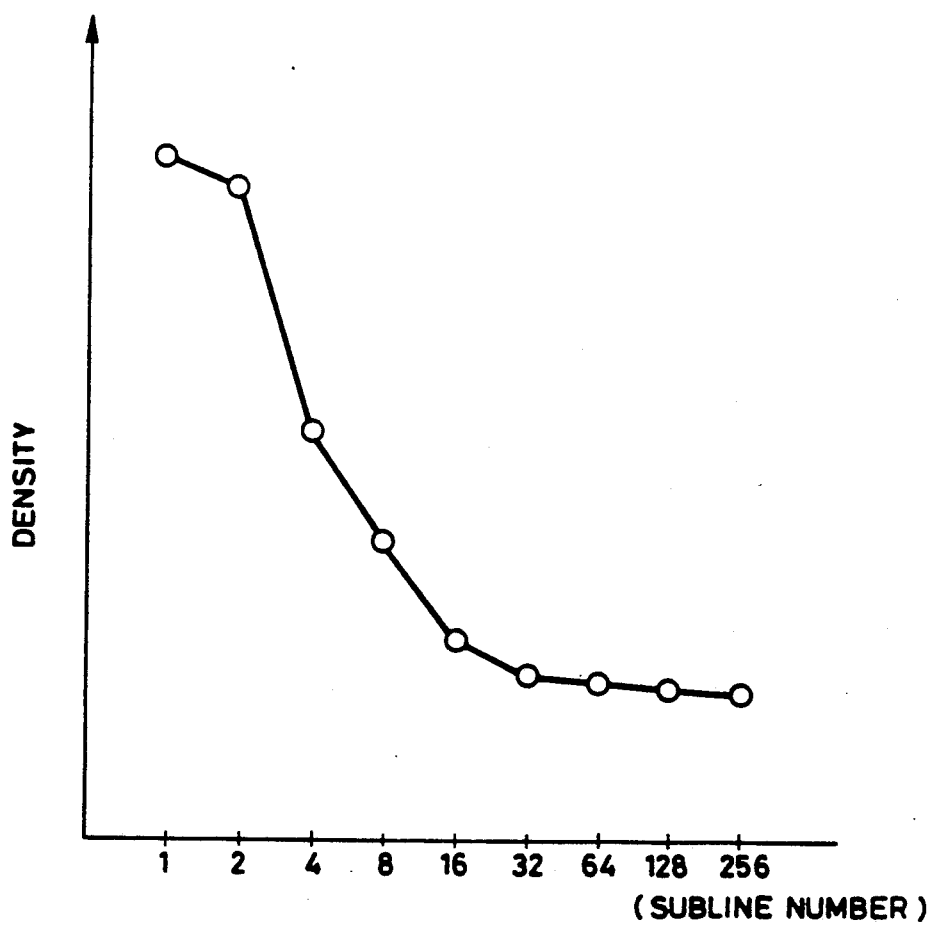
FIG. 11B is a diagram showing a relationship between the maximum density and the number of sublines.

As the number of the sublines is increased, the time for which the head is deactivated is shortened. This reduces the temperature difference between neighboring blocks and the nonuniformity of density within one block. However, heat is supplied bit by bit and so temperature rises at a lower rate. As a result, the whole image is printed thinly. FIG. 11B shows a relationship between the maximum density and the number of sublines.

In the prior art techniques and also in the above example of the invention, white stripes may be produced between neighboring blocks. These stripes are thin for two sublines, as illustrated in FIG. 11A but still visible clearly. For four sublines, they are difficult to discern. For eight sublines, they have found to be almost invisible. However, as illustrated in FIG. 11B, as the number of sublines is increased, the density decreases. Therefore, it is desired not to increase the number very much.

In this case, therefore, it is preferred to select the number of sublines to be four to eight.

If a print is made thinly, the pause period of time for which the head is deactivated is long. The result is that the white stripes between the blocks are made conspicuous. In order to avoid this problem, the number of sublines may be varied for every line according to the proportion of black or other factor. For example, the number thereof is increased when the line is dense, and it is reduced when the line is thin.

Figure 12:
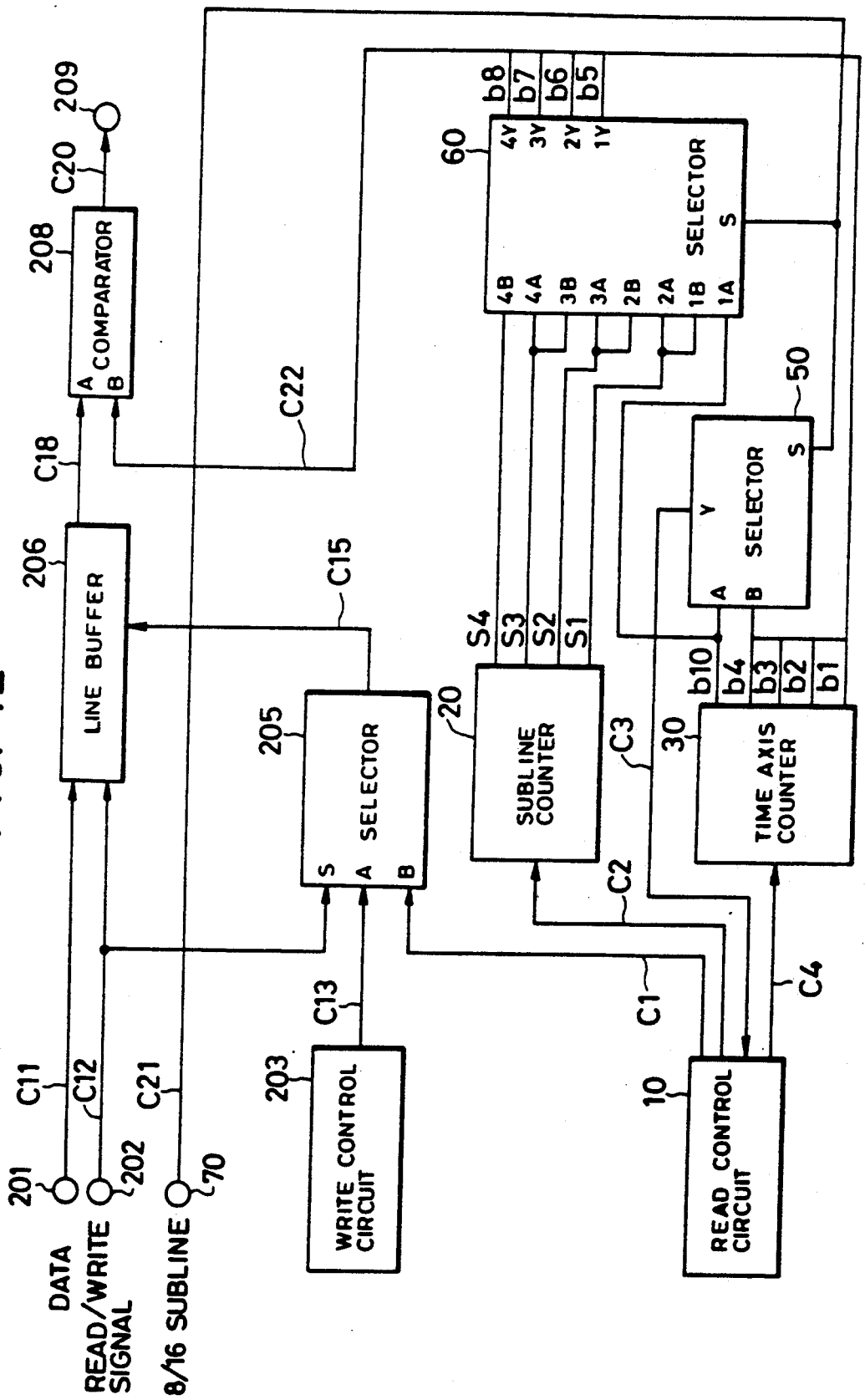
FIG. 12 and FIG. 13 are block diagrams showing modification of the embodiment of the image printer of FIG. 9.

FIG. 12 shows an example of an apparatus for driving a thermal printing head apparatus which can select the number of sublines between 8(eight) and 16(sixteen). Shown in this figure are a four-bit subline counter 20, a five-bit time axis counter 30, a one-bit selector 50, a four-bit selector 60, and an input terminal 70 to which an 8/16 subline switching signal C21 is applied.

The structure constructed as described above operates in the manner described below. It is assumed that a 8116 subline switching signal C21 of a low level is applied to the input port 70 to thereby select the mode of 16 sublines. When a selector signal C21 is at low level, the selectors 50 and 60 select the input "B". When the selector signal C21 is at high level, they select the input "A". Then, the selector 50 selects the fourth bit b4 of the output from the time axis counter 30, and supplies the output C3 which causes the block address counter 10a of the read control circuit 10 to indicate the next block. When the time axis counter 30 counts $2^4$ input signals, the block is switched to another. After the printing operation of five blocks, a count-up signal (C2) is fed to the subline counter 20 to cause it to count forward.

The selector 60 with a low selector signal C21 supplies S4, S3, S2, S1 from the subline counter 20 to its output b8, b7, b6, b5, respectively. The significant four bits of the time data C22 applied to the comparator 208 for comparing purposes thus come from the subline counter 20, whereas the least four bits come from the time axis counter 30. This is equivalent to the case where 16 sublines are employed.

When a selector signal C21 of high level indicating the made of eight sublines is applied to the input port 70, the output C3 from the selector 50 is the fifth bit b10 of the time axis counter 30. Whenever the time of is counter 30 counts the number $2^5 = 32$, the block counter indicates the next block. The outputs from the selector 60 are S3, S2, S1 and b10. The significant three bits of the data C22 come from the subline counter 20, whereas the five lower bits come from the time axis counter 30. This is equivalent to the case where 8 sublines are used.

Figure 13:
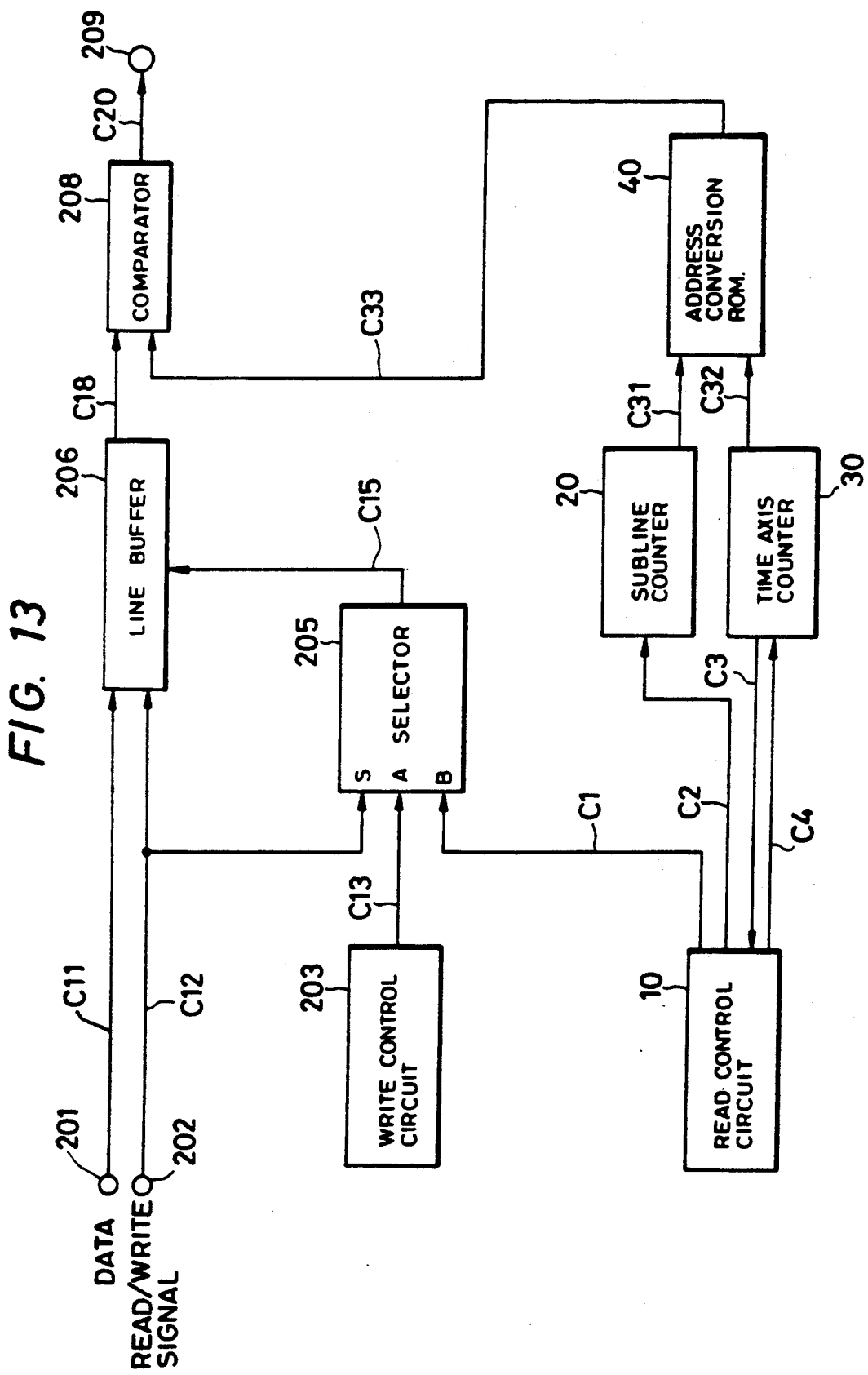

FIG. 13 is a block diagram of an apparatus in which 4 sublines are used and address conversion is performed. This conversion is performed by a ROM 21. The above described address conversion is to convert outputs C31 and C32 from the counters 20 and 30 which determine the energization time, into other values in a nonlinear manner. For example, "0" is brought to the center so that a printing of the lowest density is started from the center on the time axis.

In this way, low-density printing can be improved. Also, thermal hysteresis can be reduced. The addresses conversion can be modified into forms other than the above, and the ROM may be replaced by a gate circuit system.

As described above, according to the present invention, the image printer is equipped with the processing means which converts the arrangement of data indicating the elapse of time and controlling the activation period of the head into other arrangement. Printing operation at a low density is initiated from a position other than both ends of one picture element. Consequently, the nununiformity of density due to thermal hysteresis is reduced. Also, the development of colors at low density is improved.

Further, in accordance with the invention, one scanning line is divided into a plurality of sublines. A print is made for every subline while successively using the blocks. This shortens the period during which the head is deactivated. Also, the temperature nonuniformity within each block of the thermal printer head is reduced greatly. This minimizes the nonuniformity of density within each block. Further, the formation of white stripes at-the boundaries between the neighboring blocks is suppressed. Consequently, printing can be made with good image quality.

What is claimed is:

1. An apparatus for driving a thermal printing head for printing an image having a number of gradations, said thermal printing head having a plurality of heating elements comprising:
    data converting and processing means for processing first print control data to provide second print control data which is arranged in a different order from said first print control data independent of a previous print history;
    a comparator for comparing image data or density data obtained from said image data with said second print control data; and
    means for controlling energization periods during which each heating element of said thermal printing head is energized, according to the results of the comparisons; and
    wherein, during a printing period of time during which a portion of a line of data is printed, a printing operation for a low density value of said image or density data is started from a time after a beginning of said printing period, and said printing operation is ended at a time before an end of said printing period.

2. The apparatus as defined in claim 1, further comprising means for generating said first print control data so that a value of said first print control data increases monotonically over said printing period, said printing period being divided into N energization periods, where a 1-st and an N-th sequential one of said second print control data cause said controlling means to not energize said thermal printing head for said low density value of said image or density data.

3. The apparatus of defined in claim 2, wherein
    (A) one of numeral values 0, 1, ... M-1 which express gradations is assigned to the addresses of the N second print control data by said data converting-and-processing means, and
    (B) at least one of the numerical values is used plural times in said second print control data for one printing period to achieve a desired gradation.

4. The apparatus as defined in claim 1, wherein said data converting-and-processing means provides such said second control data which causes said controlling means to energize said thermal printing head in two or more distinct periods during said printing period for said low density value, said distinct periods being separated by at least one of said energization periods in which said thermal printing head is not energized.

5. An apparatus for driving a thermal printing head for printing an image having a number of gradations, said printing head being divided into a plurality of blocks each including a plurality of heating elements, said apparatus comprising:
- means for dividing one scanning line into a plurality of sublines to divide a printing period for said one scanning line into a plurality of subperiods;
- means for controlling said blocks of said printing head to be activated successively to complete a printing operation of each of said sublines such that an activation time of each of said plurality of blocks is divided into portions which are distributed throughout said printing period in accordance with a distribution of said subperiods; and
- address converting means for converting output data from said controlling means to a different sequence of data independent of previous print history, said controlling means energizing said plurality of heating elements in a different order accordingly.

6. An apparatus as defined in claim 5, wherein said means for dividing comprises means for selecting the number of sublines included within said image data according to data indicating the properties of black included within said image data.

7. An apparatus as defined in claim 5 further comprising means for subjecting data concerning the activation timing of said heating elements of said printing head to non-linear conversion.

8. A thermal printing apparatus, comprising:
- a thermal printing head;
- a source of an image signal having a multi-bit representation of a density to be printed by said head; and
- a comparator for sequentially comparing said multi-bit representation with an ordered sequence of multi-bit control data, an output of said comparator controlling an energization of said head through a printing period independent of a previous print history;
- wherein said multi-bit representation for a maximum value of said density causes an energization of said head for all of said sequence of said control data throughout said printing period, and said multi-bit representation for a low value of said density does not cause energization of a first one and a least one of said sequence of said control data but causes energization of said head for some of said sequence of said control data intermediate said first one and said last one and for less than all of said printing period.

9. A thermal printing apparatus, comprising:
- a thermal head comprising a plurality of blocks, each block comprising a plurality of resistive elements;
- a line buffer containing multi-bit density data for all of said resistive elements;
- a block counter for selecting a portion of said line buffer;
- a comparator for comparing each of said density data in said selected portions of said line buffer with a threshold value, one or more outputs of said comparator controlling energization of said resistive elements;
- a subline counter receiving a carry output of said block counter and providing a high order portion of said threshold value; and
- a time axis counter providing a low order portion of said threshold value.

10. A thermal printing apparatus as recited in claim 9, further comprising conversion means, interposed between said comparator and said subline and time axis counters, for altering a sequence of said multi-bit density data, each of said sublines being printed in accordance with an altered sequence of said multi-bit density data.

11. The apparatus as recited in claim 1, wherein energization of said heating element for a maximal density value of said image or density data extends throughout all of said printing period.

12. The apparatus as recited in claim 5, wherein said controlling means repeats its control operation for remaining ones of said sublines, each of said sublines being printed according to the same image data.

13. An apparatus for driving a thermal printing head for printing an image having a number of gradations, said thermal printing head having a plurality of heating elements, said apparatus comprising:
- means for quantisizing image signals of luminance signals;
- an image memory for storing quantized image data successively from an address previously specified;
- density conversion means for reading out said quantitized image data stored in said image memory and converting said quantized image data to time axis data to print in a predetermined number of linear gradations;
- system control means including counter means for counting a predetermined number in a printing period for one scanning line, a number counted by said counter means defining a time from a start of the counting;
- address converting means for converting an output of said counter means to a different order and providing an output accordingly independent of a previous print history;
- a comparator for comparing said time axis data of said density conversion means and the output of said address converting means and generating printing data accordingly; and
- printer means including a thermal head, a register for storing said printing data, and feeding means for controlling a feeding mechanism to have a predetermined aspect ratio, said printer means printing according to the printing data generated by said comparator.

14. The apparatus as claimed in claim 13, wherein said address converting means converse the output of said counter means which is increased monotonously to different data which increases from a center to both ends thereof.

15. The apparatus as claimed in claim 14, wherein said different data has plural centers.

16. The apparatus as claimed in claim 13, wherein said printer means is driven in response to the time axis data being larger than the data from said address converting means.

17. An apparatus for driving a thermal printing head for printing an image having a number of gradations, said thermal printing head having a plurality of heating elements, said apparatus comprising:
- means for quantizing image signals consisting of luminance signals;
- an image memory for storing quantized image data successively from an address previously specified;
- system control means including counter means for counting a predetermined number in a printing period for one scanning line, a number counted by said counter means defining a time from a start of the counting;

address converting means for converting an output of said counter means to gradation data which have same number of bits as the quantized image data, but in a different order, and providing an output accordingly independent of a previous print history;

a comparator for comparing said quantized image data and the output of said address converting means and for generating printing data accordingly; and printer means including a thermal head, a register for storing said printing data, and feeding means for controlling a feeding mechanism to have a predetermined aspect ratio, said printer means printing according to the printing data generated by said comparator.

18. The apparatus as claimed in claim 17, wherein said address converting means converts the output of said counter means which is increased monotonously to different data which increases from a center to both ends thereof.

19. The apparatus as claimed in claim 18, wherein said different data has plural centers.

20. The apparatus as claimed in claim 17, wherein said printer means is driven when the quantized image data is larger than the data from said address converting means.

21. An apparatus for driving a thermal printing head for printing an image having a number of gradations, said thermal printing head being divided into a plurality of blocks each including a plurality of heating elements, said apparatus comprising:

means for quantizing image signals consisting of luminance signals;

an image memory for storing quantized image data successively from an address previously specified;

density conversion means for reading out said quantized image data stored in said image memory and converting said quantized image data to time axis data to print in a predetermined number of linear gradations;

system control means including time axis counter means for counting a predetermined number in a printing period for one scanning line, a block counter for defining a processing block, and a subline counter for defining a processing subline, said subline counter being counted up by a carry up signal of said block counter;

a comparator for comparing said time axis data of said density conversion means and the data outputted from said system control means, and generating printing data accordingly; and printer means including a thermal head, a register for storing said printing data and feeding means for controlling a feeding mechanism to have predetermined aspect ration, said printer means printing according to the printing data generated by said comparator, wherein heating of plural heating elements corresponding to a line of the image is controlled in accordance with a line operating formula as follows:

(heating unit time period ts) * (a number of continuous times of the heating unit time period C) * (a number of the blocks B) * (a number of sublines S), and heating of heating elements corresponding to one pixel of the image is controlled in accordance with a pixel operating formula as follows:

(heating unit time period ts) * (a number of continuous times of the heating unit time period C) * (a number of sublines S)

wherein the above described parameters C, B and S each are set to be a positive integer not smaller than 2, and each heating element corresponding to the image is controlled to turn on or off every heating unit time period in response to the image data or the density data.

22. The apparatus as claimed in claim 21, wherein said number of sublines is selectable between 8 and 16.

23. The apparatus as claimed in claim 21, wherein the number of the sublines is larger than 4 and not larger than 16.

24. The apparatus as claimed in claim 21, wherein said pixel of the image has a center dot in an interior thereof, and said pixel expands from said center dot according to increasing of the density.

25. The apparatus as claimed in claim 24, wherein said pixel of the image has plural center dots.

* * * * *